United States Patent [19]

Tatur et al.

[11] Patent Number: 5,012,759
[45] Date of Patent: May 7, 1991

[54] APPARATUS FOR HOT GAS SPRAY DEPOSITION OF COATINGS ON PRODUCTS IN THE FORM OF BODIES OF REVOLUTION

[76] Inventors: Alexandr D. Tatur, ulitsa Parizhskoi Kommony, 21, kv. 12; Oskar G. Kilimnik, ulitsa Stroitelei, 6a, kv. 70; Mark B. Yalkut, ulitsa Serafimovicha, 7, kv. 107; Eduard A. Rubin, ulitsa Kashtanovaya, 12b, kv. 94; Viktor G. Ponomarev, ulitsa I. Franko, 9, kv. 27; Petr N. Mirchevsky, ulitsa Mechnikova, 22a, kv. 17; Ivan K. Gurzhy, ulitsa Oktyabrskoi Revoljutsii, 25, kv. 16; Alexandr A. Karev, ulitsa Uralskaya, 6/I, kv. 4; Alexandr M. Boguslavsky, prospekt Pobedy, 21, kv. 74, all of Kiev, U.S.S.R.

[21] Appl. No.: 415,367
[22] PCT Filed: Dec. 24, 1987
[86] PCT No.: PCT/SU87/00153
 § 371 Date: Aug. 21, 1989
 § 102(e) Date: Aug. 21, 1989
[87] PCT Pub. No.: WO89/05693
 PCT Pub. Date: Jun. 29, 1989
[51] Int. Cl.⁵ .............................. B05C 1/02
[52] U.S. Cl. .......................... 118/320; 118/326
[58] Field of Search ................. 118/320, 326

[56] References Cited

U.S. PATENT DOCUMENTS

| | | | |
|---|---|---|---|
| 2,751,879 | 6/1956 | Holtzman | 118/326 |
| 2,779,690 | 1/1957 | Gaiser | 118/326 |
| 3,999,507 | 12/1976 | Voermans | 118/320 |
| 4,077,356 | 3/1978 | Andrews | 118/320 |

FOREIGN PATENT DOCUMENTS

| | | | |
|---|---|---|---|
| 1243550 | 9/1960 | France | 118/320 |
| 650662 | 3/1979 | U.S.S.R. | |
| 761023 | 9/1980 | U.S.S.R. | |
| 770558 | 10/1980 | U.S.S.R. | |
| 959837 | 9/1982 | U.S.S.R. | |

Primary Examiner—Willard Hoag
Attorney, Agent, or Firm—Lilling and Lilling

[57] ABSTRACT

An apparatus for hot gas spray deposition of coatings on products in the form of bodies of revolution has a chamber accommodating a base which supports a headstock having a spindle and a tailstock having a revolving center coaxial with the spindle, and a spray gun mounted on a guide member for movement, the revolving center of the tailstock having a power actuator for axially moving the product towards the headstock, and the base having rollers for supporting the moving product, each roller having a means for its vertical movement and a rotatable shield for screening a surface of the roller from sprayed material.

5 Claims, 4 Drawing Sheets

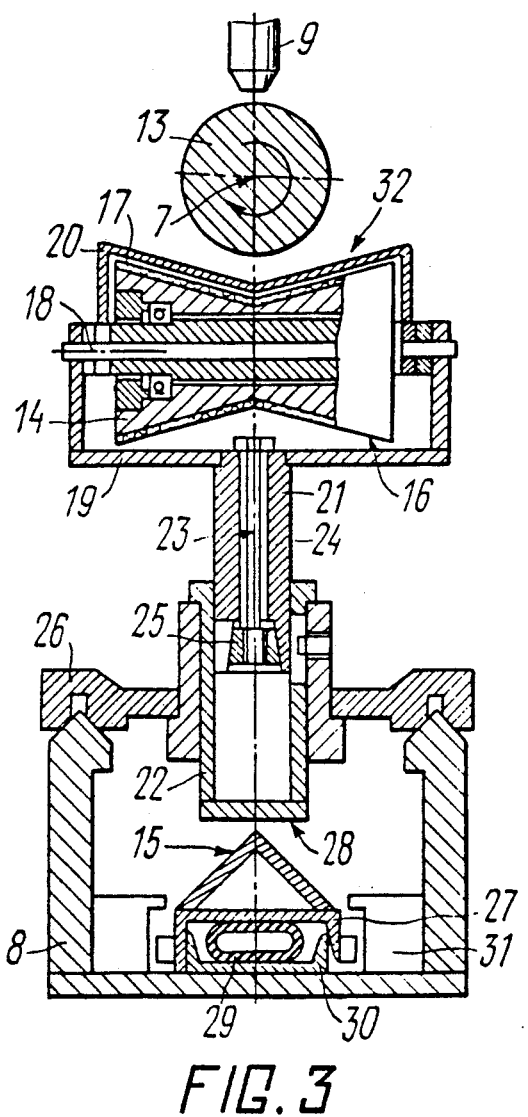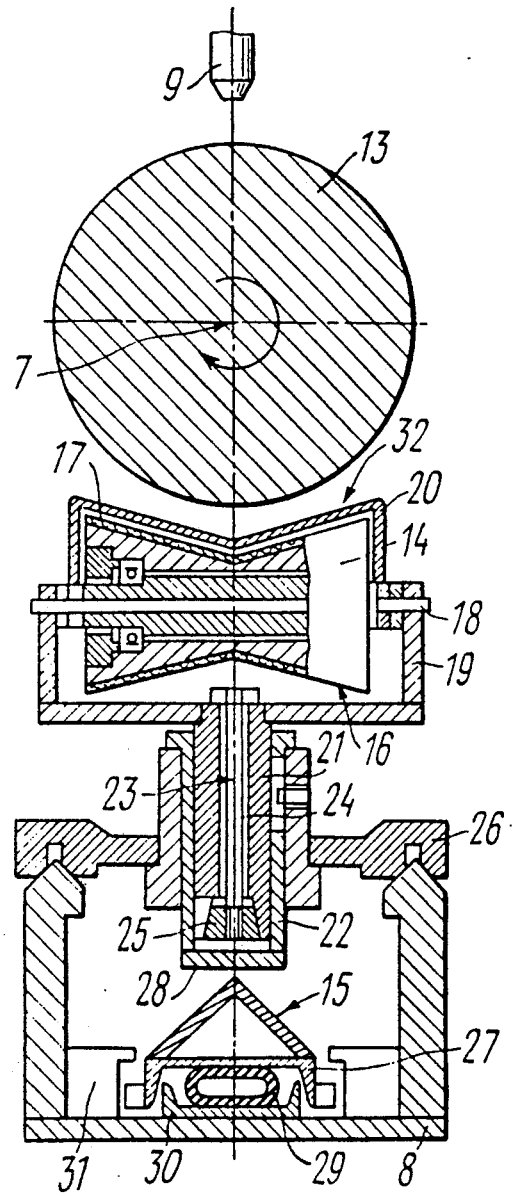

APPARATUS FOR HOT GAS SPRAY DEPOSITION OF COATINGS ON PRODUCTS IN THE FORM OF BODIES OF REVOLUTION

BACKGROUND OF THE INVENTION

1. Field of the Invention

The invention relates to equipment for applying coatings to surfaces of products, and more specifically, it deals with apparatuses for hot gas spray deposition of coatings on products in the form of bodies of revolution.

2. Description of the Related Art

Known in the art is an apparatus for applying coatings to products in the form of bodies of revolution (SU, A, No. 761023), comprising a chamber, a pair of means for rotating the product having drive rollers engageable with the product surface, transfer rollers for axially moving the product, and a spray gun. One of the means for rotating the product is mounted for movement axially along the product. Each means for rotating the product has an individual power actuator for lifting the product in the form of a hydraulic cylinder, and the transfer rollers are provided with a rotation drive. The apparatus is designed for the deposition of coatings on large-size products and in particular, on large-diameter pipes which must be installed at a coating station using special handling means.

A product having its surface preliminarily prepared for coating application is placed on the transfer rollers, the drive of the transfer rollers is switched on, and the rollers move the product towards a stationary means for rotating the product and stop. Subsequently the other means for rotating the product are moved in the same direction and stopped in the zone of the rear end of the product. The power actuators are then turned on for lifting the product which is raised from the transfer rollers, the drives of the product rotation means are then switched on, and a coating is applied to the product surface.

Since the product is rotated on the rollers of the means for rotating the product during coating deposition, a layer of coating cannot be applied to that part of the surface of the product which engages the rollers during rotation. The stationary transfer rollers are in the spray gun zone and under it during coating deposition so that a layer of coating is also applied to their surface, the coating being applied only to that part of the working surface of the roller that faces towards the spray gun. This results in local enlargements being formed on the working surface of the transfer rollers to lower reliability thereof in operation. During the axial movement of the product along the transfer rollers the surface of the product is impaired after preparation for application of the coating. As preparation for application of a hot gas spray coating involves imparting roughness to the surface with a pre-set height of crests and also elimination of grease films on the surface, the movement of the product on the transfer rollers results in the removal of the crests of the roughness and in the reappearance of grease spots on the products surface. This negatively affects quality of deposition of a hot gas spray coating on the surface.

It should also be noted that the provision of a pair of hydraulic power actuators for lifting the product and a drive for rotating the transfer rollers makes the apparatus rather complicated.

Known in the art is an apparatus for a hot gas spray deposition of coatings on products in the form of bodies of revolution WSP manufactured by PLASMA TECHNIK AG.

The apparatus comprises a chamber in which there is a base supporting a headstock having a spindle and a tailstock having a revolving center coaxial with the spindle, and a spray gun mounted for movement on the base. The tailstock is mounted for movement axially along the spindle. The revolving center of the tailstock has a manual drive for bringing it towards a center hole of the end face of a product and for retaining its axial position.

The product is manually installed in the head stock spindle, the revolving center is then inserted into the center hole of the rear end face of the product, and this axial position of the revolving center is retained. The spindle rotation drive is switched on, and the spray gun moving along a guide member applies coating to the rotating product.

The prior art apparatus has limited production capabilities as a product of up to 20 kg only can be manually installed. If products weighing more than 20 kg or products that cannot be manually installed are installed on this apparatus their surface prepared for coating application may be impaired so as to result in impaired quality of coating.

SUMMARY OF THE INVENTION

The invention is based on the problem of providing an apparatus for a hot gas spray deposition of coatings on products in the form of bodies of revolution which is so constructed as to mechanize handling of a heavy-weight product into the treatment zone without any damage to its surface prepared for coating deposition.

This problem is solved by an apparatus for a hot gas spray deposition of coatings on products in the form of bodies of revolution, comprising a chamber having a base supporting a headstock having a spindle and a tailstock having a revolving center coaxial with the spindle, and a spray gun mounted on a guide member for movement. According to the invention, the revolving center of the tailstock is provided with a power actuator for axially moving the product in the direction towards the headstock, and the base has rollers supporting the moving product, each roller having a means for vertical movement thereof and a rotatable shield screening the roller surface from the material being sprayed.

The rotatable shield is preferably in the form of a hollow body of revolution having a pair of identical members provided symmetrically with respect to the axis of the roller, the total angle of the cross-section of the members being greater than 180°.

The rotatable shield preferably has two links connected to a common pivot joint having a spring-biased fork which is engageable with the product, each link being pivotally connected to a respective member of the rotatable shield.

The screening surface of the rotatable shield is preferably mounted in an equispaced relation to the surface of the roller engageable with the product.

The surface of the roller engageable with the product is preferably provided with a coating of a hygroscopic material protecting the product surface prepared for the deposition of coating.

This construction of an apparatus for hot gas spray deposition of coatings on products in the form of bodies of revolution ensures installation of a product coaxially with the spindle axis and axial feed of the product in the direction towards the spindle without manual labor so as to enhance productivity of auxiliary operations in apparatuses for hot gas spray deposition of coatings on products in the form of bodies of revolution. The sprayed material cannot get to the transfer means in the chamber so as to impair their reliability in operation. Mechanical damage to the product surface prepared for coating deposition is ruled out and grease spots are avoided so as to enhance quality of coating.

BRIEF DESCRIPTION OF THE DRAWINGS

The invention will now be described with reference to the accompanying drawings, in which:

FIG. 3 is a sectional view taken along line III—III in FIG. 1 showing an apparatus for hot gas spray deposition of coatings on products in the form of bodies of revolution with a roller in the lower position;

FIG. 4 is the same as FIG. 3, but showing a roller in the lower position with a different diameter of a product according to the invention;

DESCRIPTION OF THE PREFERRED EMBODIMENTS

Figure 1:
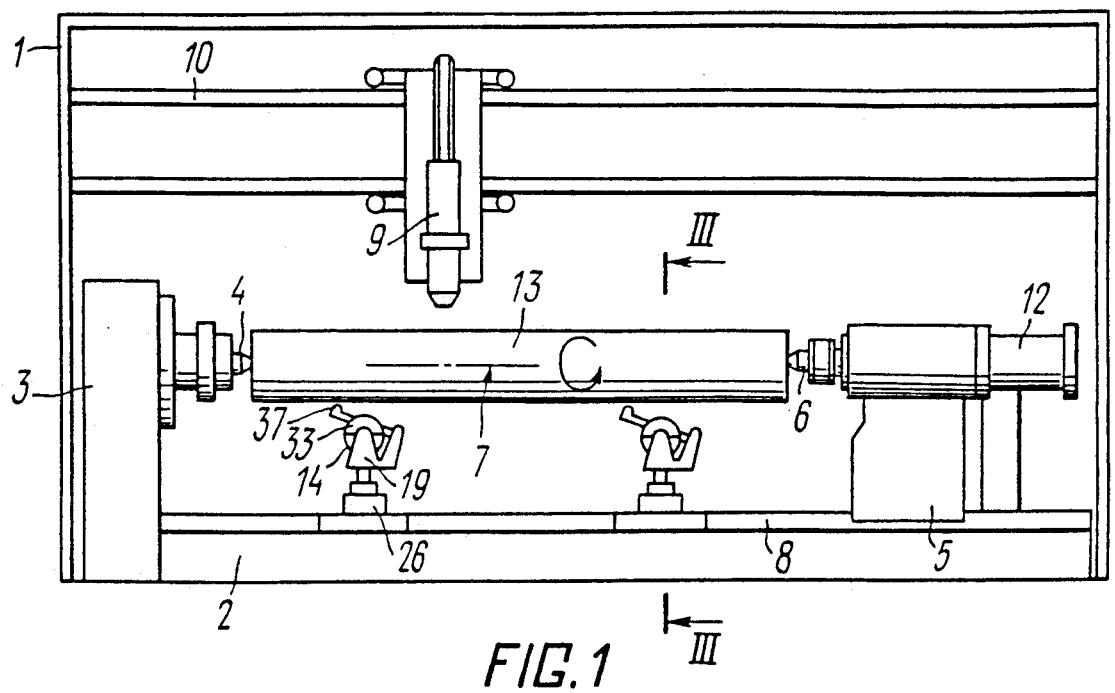
FIG. 1 is a general view of an apparatus for hot gas spray deposition of coatings on products in the form of bodies of revolution according to the invention.
Figure 2:
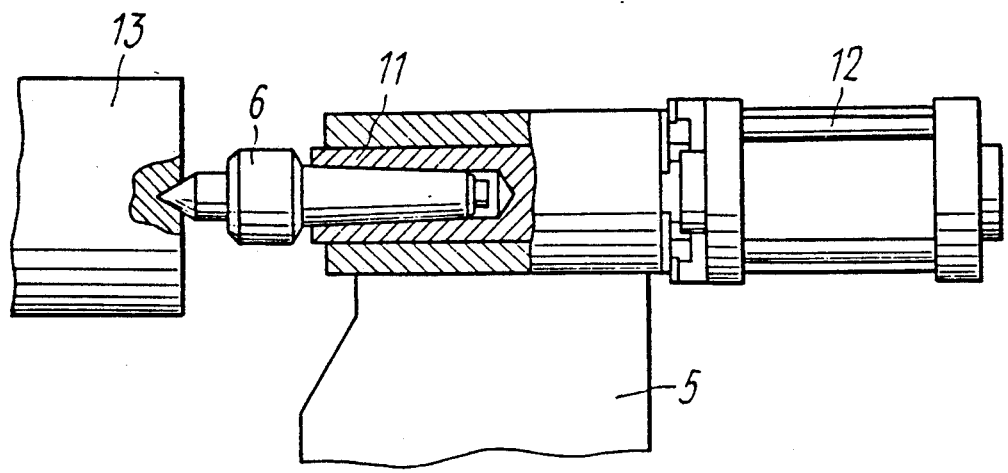
FIG. 2 shows a tailstock in section with a power actuator for axially moving products according to the invention.

An apparatus for a hot gas spray deposition of coatings on products in the form of bodies of revolution comprises a chamber 1 (FIG. 1) having a base 2 supporting a headstock 3 having a spindle 4, a tailstock 5 having a revolving center 6 coaxial with an axis 7 of the spindle 4 mounted on the base 2 for movement along a guide member 8 and for retainment of its position, and a spray gun 9 provided on guide members 10 fixed in the chamber 1 for axial and transverse movement with respect to the axis 7 of the spindle 4. The revolving center 6 is mounted in a ram 11 (FIG. 2) mounted in the tailstock 5 for movement along the axis 7 of the spindle 4 and is connected to a power actuator 12 in the form of a power cylinder having a force sufficient to axially move a product 13 (FIG. 1) towards the headstock 3 along rollers 14 provided on the base 2. Each roller 14 (FIGS. 3-5) is mounted for vertical movement and has a means for imparting this movement thereto. A surface 16 of the roller 14 engageable with the product 13 is lined with a cotton cloth lining 17 or other hygroscopic material that cannot damage the surface of the product 13 prepared for the deposition of coating that cannot leave grease spots on the surface of the product 13. Each roller 14 is mounted for rotation on a pivot pin 18 secured in a casing 19. The pivot pin 18 also carries a rotatable shield 20 screening the surface 16 of the roller 14 from the material being sprayed. The casing 19 of the roller 14 is secured to a rod 21 mounted in a sleeve 22 coaxially therewith. The axis 23 of the rod 21 and sleeve 22 extends in a vertical plane intersecting the axis 7 of the spindle 4. The rod 21 is mounted in a sleeve 22 for its adjusting movement in the sleeve 22 along the axis 23. Division marks are applied to the periphery of the rod 21 (not shown) to facilitate adjustment of the rod with 21 with respect to the sleeve 22 for various diameters of the product 13. The rod 21 has a bolt 24 and a retainer 25 in the form of a conical bushing to retain its vertical position with respect to the sleeve 22. The sleeve 22 is mounted for vertical movement in a carriage 26 which is mounted on a guide member 8 for adjustment along the axis 7 and for retaining its position.

Means 15 for vertically moving the roller 14 are provided in the guide member 8 and comprise a lifting beam 27 provided under end faces 28 of the sleeves 22 to extend along the axis 7 and a hose 29 connected to a compressed air line and placed in a bed 30. Abutments 31 are provided on the guide member 8 to limit the upward stroke of the lifting beam 27.

Figure 6:
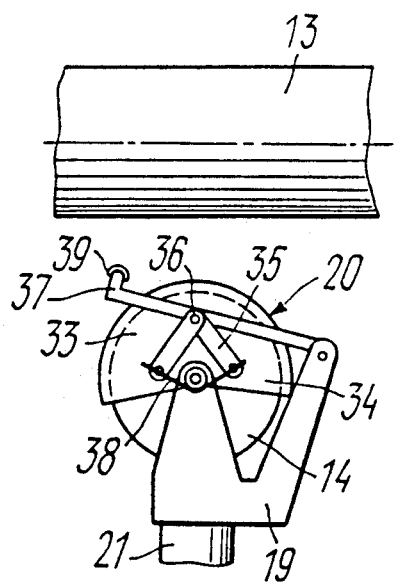
FIG. 6 shows a roller having a rotatable shield with the upper position of the roller before placing a product thereon according to the invention.

The rotatable shield 20 (FIGS. 3, 4) is made in the form of a hollow body of revolution, and a screening surface 32 of the rotatable shield 20 is positioned in an equispaced relation to the surface 16 of the roller 14. The rotatable shield 20 has a pair of identical members 33 and 34 (FIGS. 6-8) positioned symmetrically with respect to the pin 18 of the roller 14. The total angle of the cross-section of the members 33 and 34 is greater than 180° so as to ensure a reliable protection of the surface 16 of the roller 14 against the material sprayed from the top. The members 33 and 34 are pivotally connected to a pair of links 35 which are connected to a common pivot joint 36 by having a rotatable fork 37 pivotally mounted on the casing 19 of the roller 14. The rotatable fork 37 is biased by low-force a spring 38 towards the product 13. The distal end 39 of the surface of the rotatable fork 37 engageable with the product 13 is lined with cotton cloth similar to the lining 17 of the roller 14.

The apparatus for hot gas spray deposition of coatings on products in the form of bodies of revolution functions in the following manner.

Figure 7:
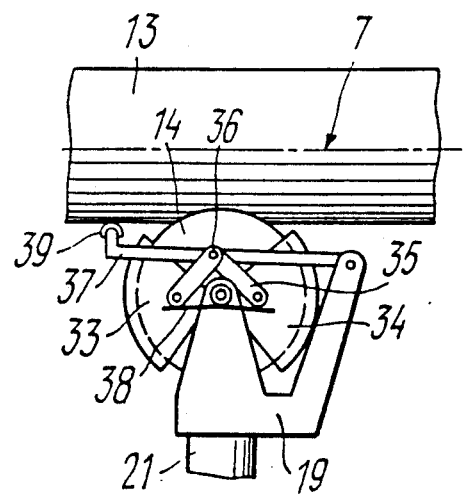
FIG. 7 shows a roller having a rotatable shield after placing a product on the roller according to the invention.
Figure 8:
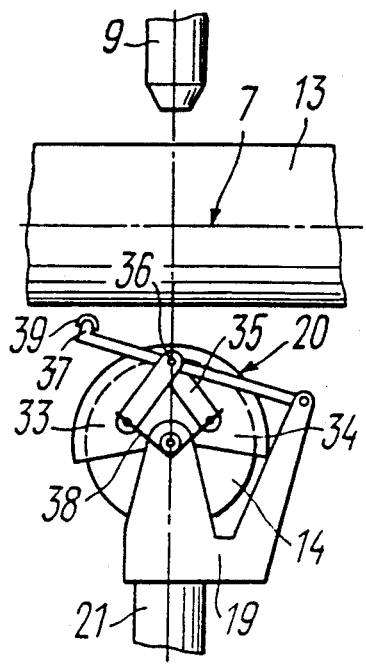
FIG. 8 shows a roller having a rotatable shield in the lower position of the roller during rotation of the product according to the invention.
Figure 5:
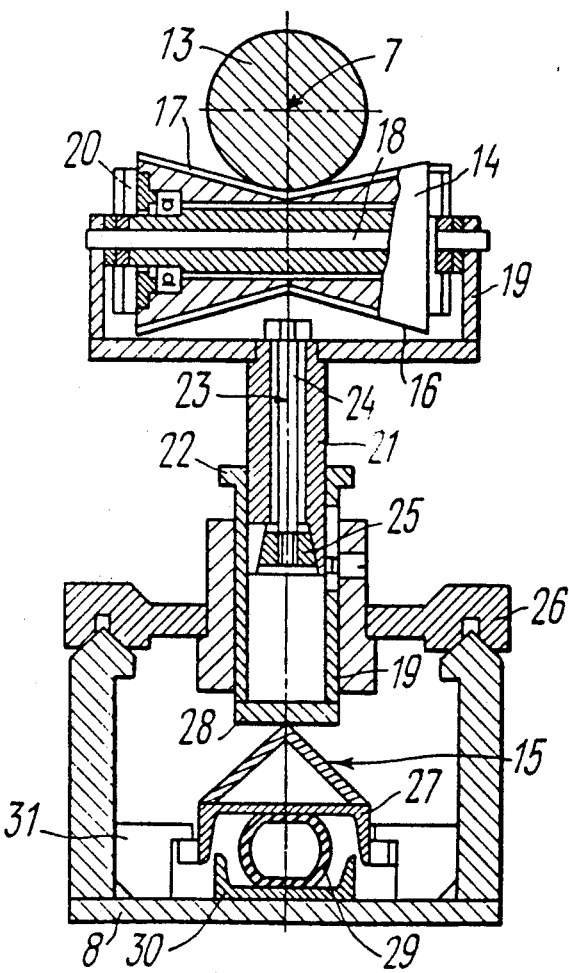
FIG. 5 is the same as FIG. 3, with a roller in the upper position accoding to the invention.

The tailstock 5 (FIGS. 1, 3, 4) is moved along the guide member 8 and is retained thereon in a position determined by length of the product 13; the carriages 26 with the rollers 14 are also moved along the guide member 8 and retained in positions depending on length of the product 13. The starting vertical position of the roller 14 is then adjusted in accordance with diameter of the product 13. For that purpose, with the lifting beam 27 and sleeve 22 in the lower position, the retainer 25 is pressed out by the bolt 24, and the rod 21 is moved with respect to the sleeve, whereafter the rod 21 is retained in the sleeve against a preset division by means of the bolt 24 and retainer 25 in a position depending on diameter of the product 13. The starting position of the rod 21 with the roller 14 is lowered in accordance with the diameter of the product 13 (FIGS. 3 and 4). Compressed air is supplied to the hose 29, and the beam 27 moves up to the upper position until it bears against the abutments 31. During its upward movement, the beam 27 lifts the sleeve 21 together with the rod 21 and roller 14 to the upper position. The members 33 and 34 of the rotatable shield 20 are moved close to each other by the spring 38 in this position (FIG. 6), and the fork 37 is raised. With the spray gun 9 retracted from the working position, the product 13 is lowered on the raised rollers 14 (FIG. 7). When the product 13 is lowered, it causes the fork 37 to rotate so as to turn the members 33 and 34 of the rotatable shield 20 in opposite directions. As the starting position of the rods 21 has been adjusted in accordance with divisions, the axis of rotation of the product 13 placed on the raised rollers 14 is aligned with the axis 7 of the spindle 4 (FIG. 5). The power actuator 12 of the tailstock 5 is switched on to insert the cone of the revolving center 6 into the center hole of the product 13, and the revolving center 6 then moves the product 13 along the rollers 14 towards the headstock 3 (FIGS. 1, 2) until it bears against the spindle 4. During movement of the product 13 along the rollers 14 its surface engages the cotton cloth 17 so as to rule out a mechanical damage to the surface prepared for the deposition of coating and also to avoid appearance of grease spots on the surface of the product. After the installation of the product 13 in the spindle 4 and revolving center 6, the lifting beam 27 is lowered, and the rollers 14 are also lowered. The fork 37 is turned up by force of the spring 38, and the members 33 and 34 of the rotatable shield 20 are brought closer to each other (FIG. 8). With the roller 14 in the lower position, a clearance is defined between the working surface of the fork 37 and the generant of the product 13. The spray gun 9 is then brought to the working zone, the drive of the spindle 4 is switched on, and the spray gun 9 is moved axially along the axis 7 of the spindle 4 to apply a layer of coating to the surface of the rotating product 13. As the members 33 and 34 of the shield 20 are brought closer to each other during coating deposition, and the total angle of their cross-section is greater than 180°, the screening surface 32 of the shield 20 reliably protects the surface of the roller 14 and the cotton cloth 17 against sprayed material. When the coating deposition is completed, the drive of the spindle 4 is switched off, the spray gun 9 is switched off and retracted from the working zone, and the lifting beam 27 again raises the rollers until they engage the product 13. The members 33 and 34 of the rotatable shield 20 are moved apart (FIG. 7).

Therefore, the provision of the power actuator 12 on the tailstock 5 of the apparatus for hot gas spray deposition of coatings on products in the form of bodies of revolution for axially moving the product towards the headstocks and the provision of the rollers 14 on the base 2 for holding the product 13 during its axial movement, the rollers being out of touch with the product during coating deposition, allow a rapid and easy installation of a large-size product weighing more than 20 kg on the headstock 3 and tailstock 5 to be carried out without using manual labor.

Productivity of auxiliary operations in the apparatuses for hot gas spray deposition of coatings on products in the form of bodies of revolution is thereby improved. With such an installation of heavy-weight products, mechanical damage to the surface of the product, prepared for the deposition of hot gas spray coating, do not occur, and grease spots cannot appear on the product surface, thus enhancing quality of coatings.

The rotatable shields 20 reliably protect the surface of the rollers 14 which are engageable with the product during deposition of coating so as to enhance reliability of the transfer rollers 14 in operation and retain their configuration. Accuracy of axial feed of the product to the spindle 4 is therefore enhanced.

The invention may be used for carrying out auxiliary production operations in apparatuses for the deposition of any coatings on products in the form of bodies of revolution in the metallurgical and chemical industries.

We claim:

1. In an apparatus for hot gas spray deposition of coatings on products in the form of bodies of revolution, having a chamber having a base supporting a headstock having a spindle and a tailstock having a revolving center coaxial with the spindle, and a spray gun mounted on a guide member for movement, the improvement comprising a power actuator provided for the revolving center of the tailstock for axially moving the product towards the headstock, and rollers provided on the base for supporting the product during its movement, each roller having a means for imparting vertical movement thereto and a rotatable shield screening a surface of the roller from the sprayed material.

2. An apparatus according to claim 1, wherein the rotatable shield is in the form of a hollow body revolution having a pair of identical members positioned symmetrically with respect to a pivot pin of the roller, the total angle of cross-section of the members being greater than 180°.

3. An apparatus according to claim 1 or 2, wherein the rotatable shield has a pair of links connected to a common pivot joint having a spring biased fork engageable with the product, each link being pivotally connected to a respective member of the rotatable shield.

4. An apparatus according to claim 1 or 2, wherein the screening surface of the rotatable shield is provided in an equispaced relation to the surface of the roller engageable with the surface of the product.

5. An apparatus according to claim 1, wherein the surface of the roller engageable with the product is provided with a lining of a hygroscopic material protecting a surface of the product which is prepared for the deposition of coating.

* * * * *